US012565330B2

(12) United States Patent     (10) Patent No.:     US 12,565,330 B2
    Petkar et al.              (45) Date of Patent:          Mar. 3, 2026

(54) AIRCRAFT BIRD STRIKE REDUCTION DEVICE

(71) Applicant: General Electric Company, Schenectady, NY (US)

(72) Inventors: Kirti Petkar, Bengaluru (IN); Sesha Subramanian, Bengaluru (IN); Nicholas J. Kray, Mason, OH (US)

(73) Assignee: General Electric Company, Evendale, OH (US)

( * ) Notice: Subject to any disclaimer, the term of this patent is extended or adjusted under 35 U.S.C. 154(b) by 938 days.

(21) Appl. No.: 17/806,222

(22) Filed: Jun. 9, 2022

(65)          Prior Publication Data

US 2023/0399123 A1      Dec. 14, 2023

(51) Int. Cl.
    B64D 47/02      (2006.01)
    B64D 45/00      (2006.01)
    G02B 30/56      (2020.01)

(52) U.S. Cl.
    CPC ............. B64D 45/00 (2013.01); B64D 47/02 (2013.01); G02B 30/56 (2020.01); B64D 2045/0095 (2013.01)

(58) Field of Classification Search
    CPC . G02B 30/56; B64D 47/02; B64D 2045/0095
    See application file for complete search history.

(56)          References Cited

U.S. PATENT DOCUMENTS

| | | | |
|---|---|---|---|
| 7,930,989 B2 | 4/2011 | Doty, III et al. | |
| 10,122,974 B2 | 11/2018 | Cho et al. | |
| 10,220,959 B2 | 3/2019 | Khawam | |
| 10,238,100 B2 | 3/2019 | Henskes et al. | |
| 10,321,672 B2 | 6/2019 | Ronning | |
| 10,351,258 B1 | 7/2019 | Barnes | |
| 10,377,503 B2 | 8/2019 | Porte et al. | |
| 10,709,127 B2 | 7/2020 | Ronning | |
| 2016/0029615 A1 | 2/2016 | Newcamp et al. | |
| 2018/0070577 A1 | 3/2018 | Farrell | |
| 2019/0241278 A1* | 8/2019 | Khawam | ............... B64D 47/06 |

* cited by examiner

*Primary Examiner* — Ryan D Howard

(74) *Attorney, Agent, or Firm* — Hanley, Flight & Zimmerman, LLC

(57)          ABSTRACT

In one aspect, a device for preventing bird strikes to an engine. The device includes a projector mounted on a component of the engine. The projector is positioned to project an image outside of the engine. In another aspect, an engine for an aircraft. The engine includes an engine component and a projector mounted on the engine component. The projector is positioned to project an image outside of the engine.

20 Claims, 6 Drawing Sheets

100

105

110

115

What Many Birds Can See

AIRCRAFT BIRD STRIKE REDUCTION DEVICE

TECHNICAL FIELD

The present disclosure relates to a system to reduce bird strike events for aircraft, and aircraft engines in particular.

BACKGROUND

Aircraft, especially aircraft with turbomachine engines, are susceptible to bird strike events. Over fifteen hundred bird strike events a year are recorded. Bird strikes have caused many accidents, including accidents with human casualties, and pose a significant threat to flight safety. Bird strikes can cause substantial damage, including fan blade scrap, unserviceable damage, and unscheduled engine removal. This results in significant maintenance and increased cost. Turbomachine engines on aircraft are particularly vulnerable to bird strike events at altitudes below three thousand feet (e.g., during takeoff), where birds are more commonly found. Other areas of the aircraft are also vulnerable, including the cockpit canopy, the tail, and the wings.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, or structurally similar elements.

DETAILED DESCRIPTION

Figure 1:
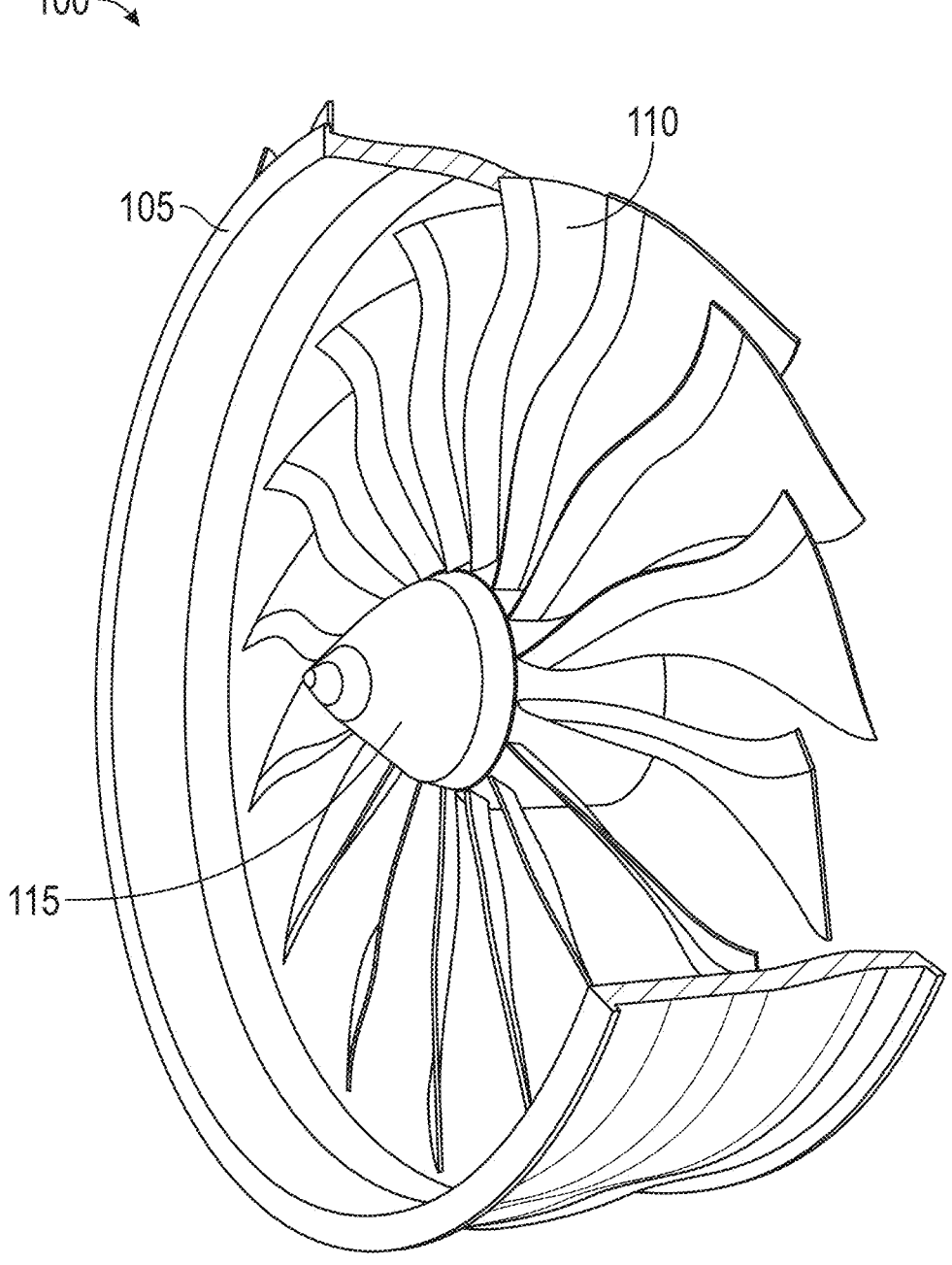
FIG. 1 is a cutaway view that shows an example portion of a turbomachine engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components. As used herein, the terms "set," a "set" of, or a "plurality" of elements can be any number of elements, including only one.

The terms "fore" (or "forward") and "aft" refer to relative positions within a gas turbine engine or vehicle, and refer to the normal operational attitude of the gas turbine engine or the vehicle. For example, with regard to a gas turbine engine, forward refers to a position closer to an engine inlet and aft refers to a position closer to an engine nozzle or exhaust.

The terms "outer" and "inner" refer to relative positions within a turbomachine engine, from a centerline axis of the engine. For example, outer refers to a position farther from the centerline axis and inner refers to a position closer to the centerline axis.

The terms "coupled," "fixed," "attached to," and the like, refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

One or more components of the turbomachine engine described below may be manufactured or formed using any suitable process, such as an additive manufacturing process or a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of turbomachine engine components having unique features, configurations, thicknesses, materials, densities, passageways, headers, and mounting structures that may not have been possible or practical using prior manufacturing methods. Some of these features are described below.

This disclosure and various embodiments relate to a turbomachine engine, also referred to as a gas turbine engine, a turboprop engine, or a turbomachine. These turbomachine engines can be applied across various technologies and industries. Various embodiments may be described herein in the context of aeronautical engines and aircraft machinery.

In some embodiments, a turbomachine engine can be a direct drive engine. In other embodiments, a turbomachine engine can be a geared engine with a gearbox. In some embodiments, a propulsor of a turbomachine engine can be a fan encased within a fan case or a nacelle. This type of turbomachine engine can be referred to as "a ducted engine." In other embodiments, a propulsor of a turbomachine engine can be exposed (e.g., not within a fan case or a nacelle). This type of turbomachine engine can be referred to as "an open rotor engine" or an "unducted engine."

FIG. 1 is a cutaway view that shows an example of a portion of a turbomachine engine 100, according to some embodiments. Types of such engines include turboprops, turbofans, propfans, open fans, and turbojets. In the example of FIG. 1, the turbomachine engine 100 is a ducted engine.

Other embodiments are not limited to ducted engines, but include other types of engines, including unducted engines, open-rotor engines, etc.

The turbomachine engine 100 is protected by an engine cowl 105, so that the only components visible in this exterior view are a fan assembly 110 arranged circumferentially around a spinner cone 115. The engine cowl 105 extends in the forward direction beyond the fan assembly 110, to define an inlet for incoming atmospheric air to flow into the engine and directly into the blades of the fan assembly 110, while also preventing air or objects from entering the fan assembly 110 from the side. A nozzle, not visible in FIG. 1, also protrudes from the aft end of the turbomachine engine 100 beyond the engine cowl 105. As noted, only the engine assembly 110 and spinner core 115 of the turbomachine engine 100 are depicted in FIG. 1, and the turbomachine engine 100 includes additional components which may not be depicted or described herein. However, it should be appreciated that the additional components of the turbomachine engine 100, whether or not described herein, are included within the scope of the present disclosure.

A portion of the air taken in by the turbomachine engine 100 flows through the turbomachine engine 100 in a flow path from fore to aft through the fan assembly 110, compressors (not shown), a combustor (not shown), and turbines (not shown). Another portion of the air bypasses the flow path, and is driven backwards by the fan assembly 110. The combustor receives a mixture of fuel from a fuel system (not shown) and air from the compressors. This mixture is ignited by an ignition system (not shown), creating hot combustion gases that flow from fore to aft through the turbines, which provides a torque to rotate one or more shafts (not shown) along a centerline axis of the turbomachine engine 100. The shafts physically couple the turbines to the compressors and the fan assembly 110.

The forward stages of the turbomachine engine 100 (e.g., the fan assembly 110 and the compressors) prepare the intake air for ignition, but also require power in order to rotate. The rear stages of the turbomachine engine 100, namely, the combustor and the turbines, provide that power, by igniting the compressed air and using the resulting hot combustion gases to rotate the shafts (also referred to as rotors). The energy to provide this power is provided by the combustion of fuel in the combustor. In this manner, the rear stages use air to physically drive the front stages, and the front stages are driven to provide air to the rear stages.

As the exhaust gas exits out of the aft end of the rear stages, the exhaust gas reaches the nozzle (not shown in FIG. 1) at the aft end of the turbomachine engine 100. When the exhaust gases pass over the nozzle, and combine with bypassed air that is also being driven by the fan assembly 110, an exhaust force is created, which is the thrust generated by the turbomachine engine 100. This thrust propels the turbomachine engine 100, and, for example, an aircraft to which the turbomachine engine 100 may be mounted, in the forward direction.

In the example shown in FIG. 1, the fan assembly 110 is located forward of the turbines in a "puller" configuration, and the exhaust nozzle is located aft. Other configurations are contemplated within the scope of the present disclosure, including but not limited to a "pusher" configuration in which the turbines are located forward of the fan assembly 110.

The turbomachine engine 100 depicted in FIG. 1 is by way of example only. In other embodiments, the turbomachine engine 100 may have any other suitable configuration, including, for example, any other suitable number of shafts or spools, fan blades, turbines, compressors, etc. The fan assembly 110 may be any suitable fixed-pitched assembly or variable-pitched assembly. The turbomachine engine 100 may include additional components not shown in FIG. 1, such as vane assemblies or guide vanes, etc. These components may be arranged in the same order or in a different order than discussed above.

Figure 2:
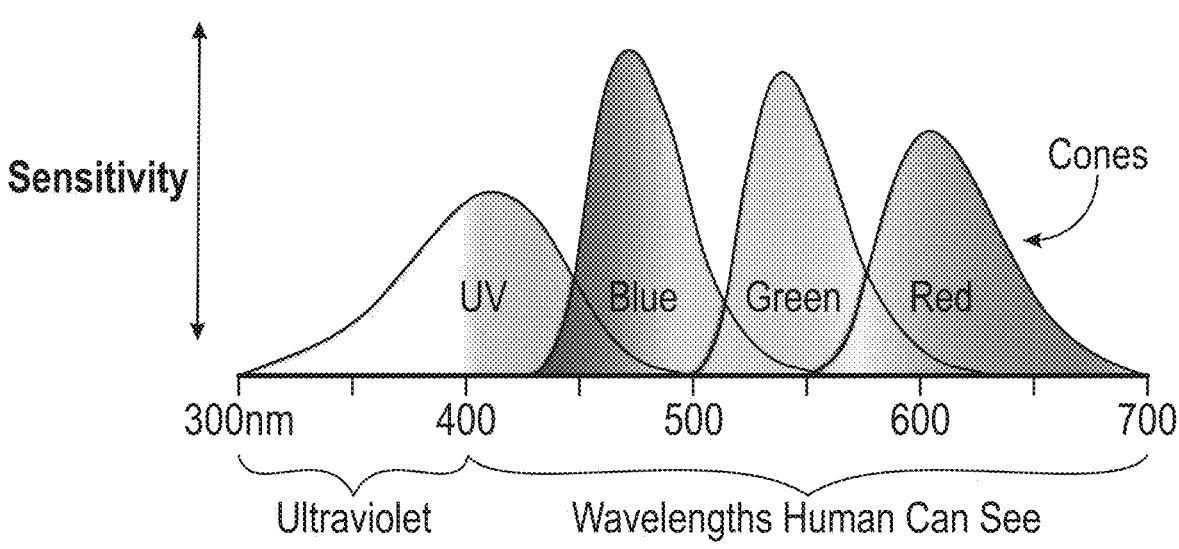
FIG. 2 is a graph that shows the sensitivity of birds and humans to different wavelengths of light.

FIG. 2 is a graph that shows the sensitivity of birds and humans to different wavelengths of light. Humans have trichromatic vision, with three types of cone structures in their eyes that are sensitive to three different color ranges, with long wavelengths (red), medium wavelengths (green), and short wavelengths (blue), in the visible color spectrum. Birds have tetrachromatic vision, with long-, medium-, and short-wavelength cones like those of humans, and an additional cone type enabling them to detect longer wavelengths in the near ultraviolet range (e.g., between three hundred and four hundred nanometers). Due to the sensitivity of avian eyesight to these wavelengths, low- to moderate-power light beams (e.g., LED light, etc.) can be effective dispersal tools against some avian species and are suitable for bird strike reduction.

Figure 3A:
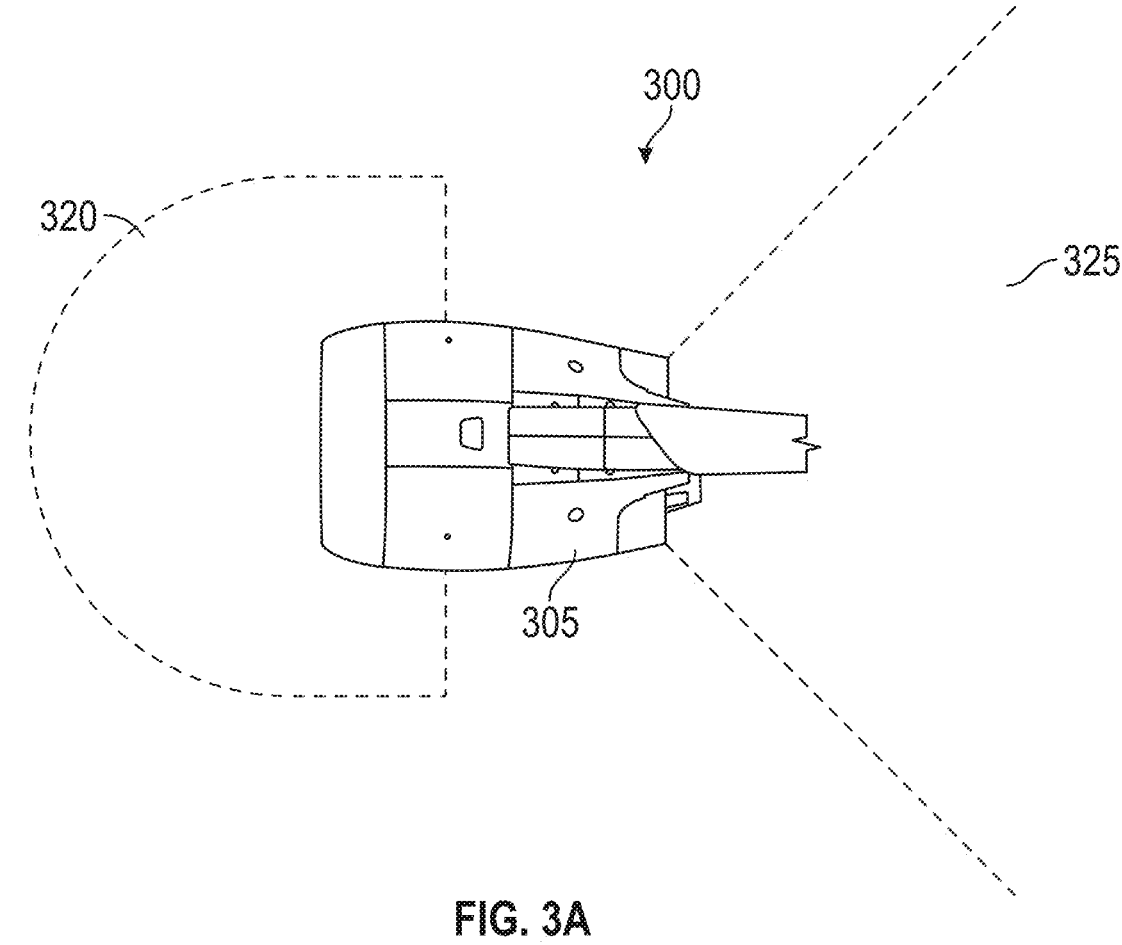
FIG. 3A is a schematic that illustrates examples of an inlet hazard area and an exhaust hazard area for a turbomachine engine.

FIG. 3A is a schematic that illustrates examples of hazard areas for a turbomachine engine 300 of some embodiments. The turbomachine engine 300 in this example is a ducted engine that is protected by an engine cowl 305. The thrust power of the turbomachine engine 300 creates an inlet hazard area 320 and an exhaust hazard area 325. The inlet hazard area 320 extends one hundred eighty degrees around the forward edge of the engine cowl 305, with a radius that is dependent on the thrust. As an example, during takeoff, the radius of the inlet hazard area may be 46.8 feet (14.3 meters). At higher speeds (e.g., at cruising altitude), the radius may increase. In addition, the inlet hazard area 320 also extends in the aft direction from the forward edge of the engine cowl 305, for some distance along the sides of the turbomachine engine 300. As an example, during takeoff, this distance may be 18.1 feet (5.5 meters). Objects (e.g., birds) within the inlet hazard area 320 are at risk of being drawn into the interior of the turbomachine engine 300, due to the powerful suction forces generated by the fan assembly 110 (not shown in FIG. 3A). During flight, the geometry of the inlet hazard area 320 may change depending on the forward speed of the aircraft 350. For example, at higher speeds (e.g., at cruising altitude), the inlet hazard area 320 may assume an elongated shape with a long axis parallel to the direction of travel of the turbomachine engine 300.

Figure 3B:
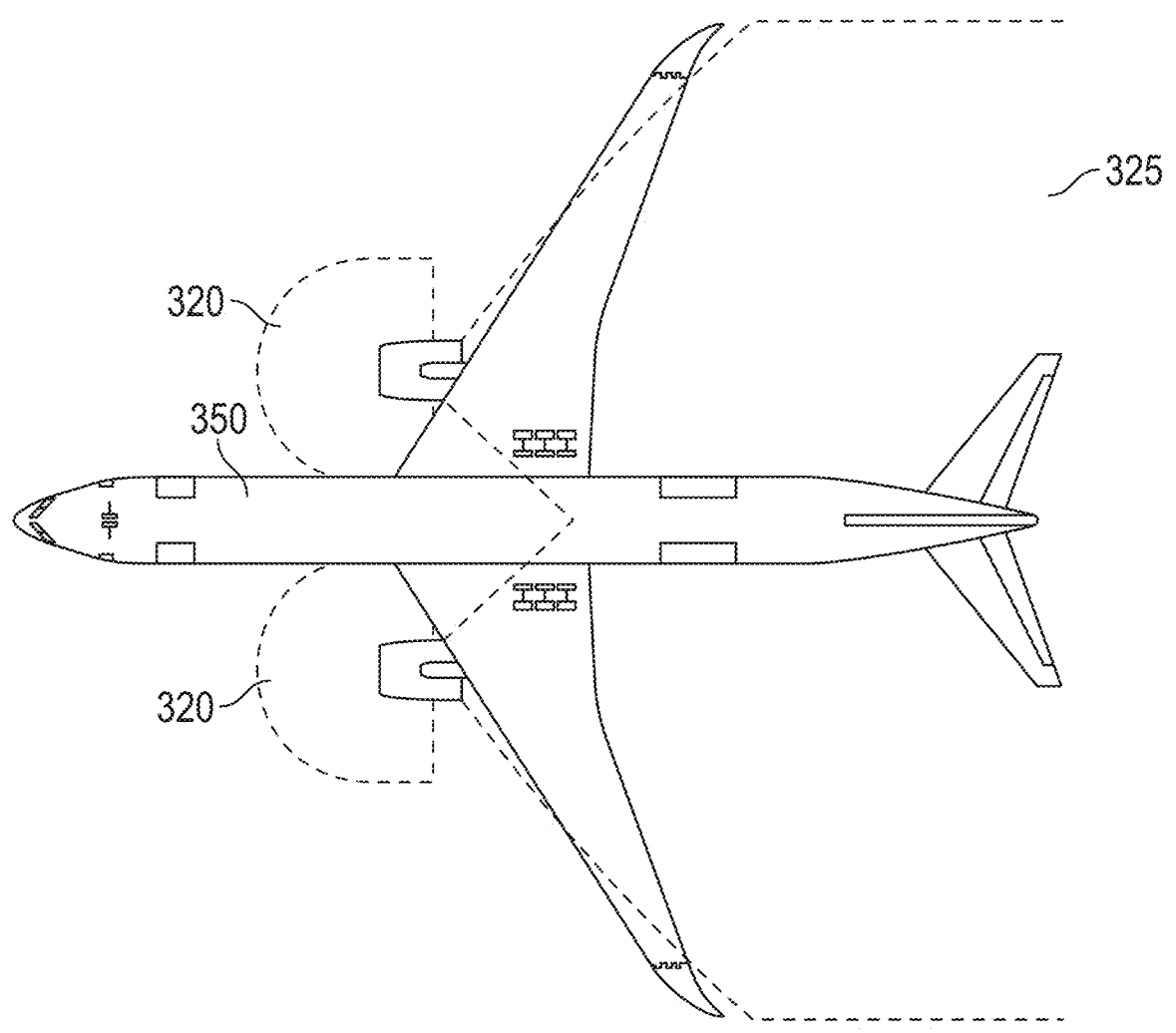
FIG. 3B is a schematic that shows that the exhaust hazard area for the turbomachine engine of FIG. 3A is larger than the inlet hazard area.

The exhaust hazard area 325 extends from the rear of the turbomachine engine 300 at an angle (e.g., forty-five degrees). FIG. 3B shows that the exhaust hazard area 325 extends much farther away from the turbomachine engine 300 than the inlet hazard area 320. As an example, during takeoff, the exhaust hazard area 325 may extend 2100 feet (640 meters). This distance is much greater than the dimensions of the aircraft 350 itself. The exhaust thrust generated by the turbomachine engine 300 serves to push objects away rather than draw them inside. As a result, bird strike events that occur in the exhaust hazard area 325 may be more frequent from the side of the turbomachine engine 300.

Some embodiments of the present disclosure use images that are projected externally from the turbomachine engine 300 or the aircraft 350, to frighten or to deter birds from flying into proximity of the inlet hazard area 320. The images are generated by projectors that are mounted to different components of the turbomachine engine 300 or the aircraft 350.

Figure 4:
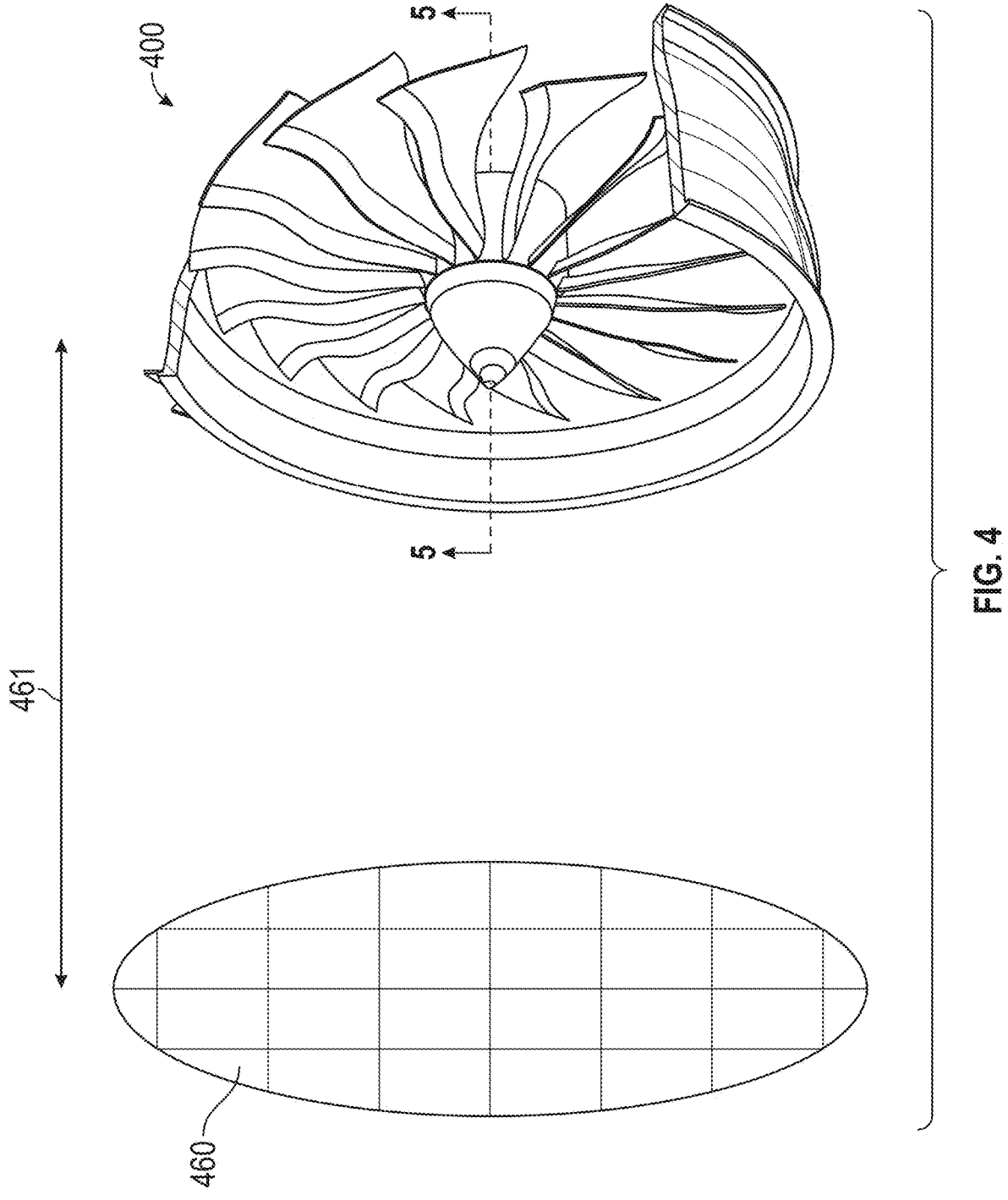
FIG. 4 shows an example of a projected image for a bird strike prevention system for a turbomachine engine 400, according to some aspects of the present disclosure.

FIG. 4 shows an example of a projected image for a bird strike prevention system for a turbomachine engine 400 in some embodiments. The turbomachine engine 400 is equipped with a projection system (not shown) that generates a projected image 460 at a distance (represented by arrow 461) in front of the turbomachine engine 400. For example, in some embodiments, the distance may be on the order of three hundred feet (e.g., one hundred meters). The projected image 460 may be generated using specific wavelengths (e.g., UV wavelengths between three hundred nanometers and four hundred nanometers, as described with reference to FIG. 2) that are only visible to birds, and are not visible to pilots of the aircraft 350, pilots of other aircraft, or passengers.

In some embodiments, the projected image 460 may be a hologram or a laser projection. For example, the projected image 460 may be a two-dimensional pattern (e.g., a grid pattern or a grill pattern) generated from a laser projection system. As another example, the projected image 460 may be a three-dimensional image generated from a holographic projection system (not shown in FIG. 4). The projected image 460 may be any suitable shape, such as a solid shape, an image of a predator, or any other object that will be perceived by birds as physically dangerous. Some bird species are able to see eight times farther than humans (e.g., can perceive objects up to two miles away). Accordingly, the projected image 460 may cause birds to change course well before they enter the inlet hazard area 320 (FIGS. 3A and 3B).

Figure 5:
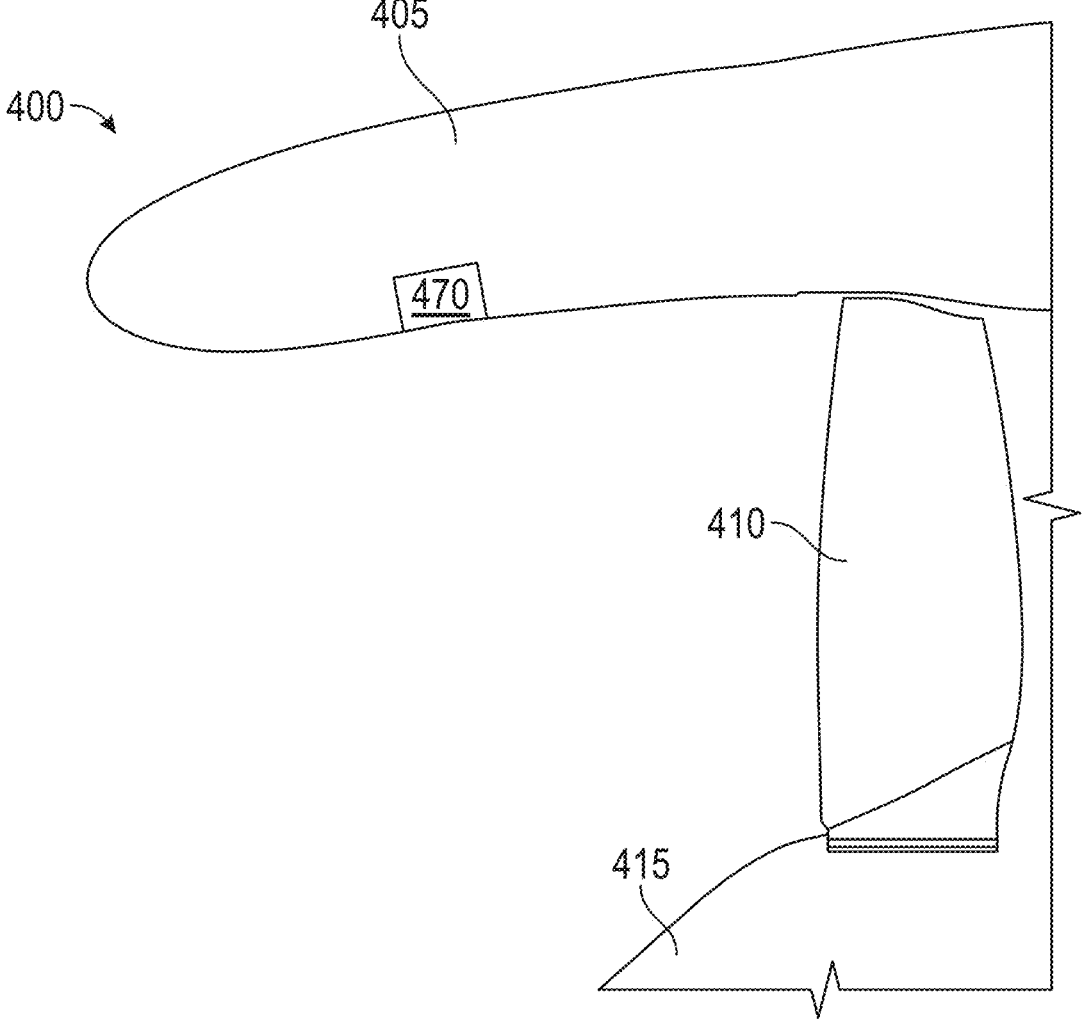
FIG. 5 shows a cross-sectional view taken along line 5-5 of the turbomachine engine shown in FIG. 4, when the projection system is embedded in an overhanging portion of the cowl.

FIG. 5 shows a cross-sectional view taken along line 5-5 of the turbomachine engine 400 in FIG. 4. In this example, the engine cowl 405 extends in the forward direction beyond the fan assembly 410 and the spinner cone 415. In some embodiments, the projection system 470 is embedded in the overhanging portion of the engine cowl 405. The projection system 470 may be flush mounted with the inside surface of the engine cowl 405, to minimize impact on air flow into the turbomachine engine 400. The projection system 470 may also be protected by a cover that is made of a material that is transparent to the wavelengths of light or lasers used by the projection system 470. The projection system 470 may include multiple projectors that are spaced circumferentially around the inner circumference of the engine cowl 405, in order to create three-dimensional patterns or holograms.

Figure 6:
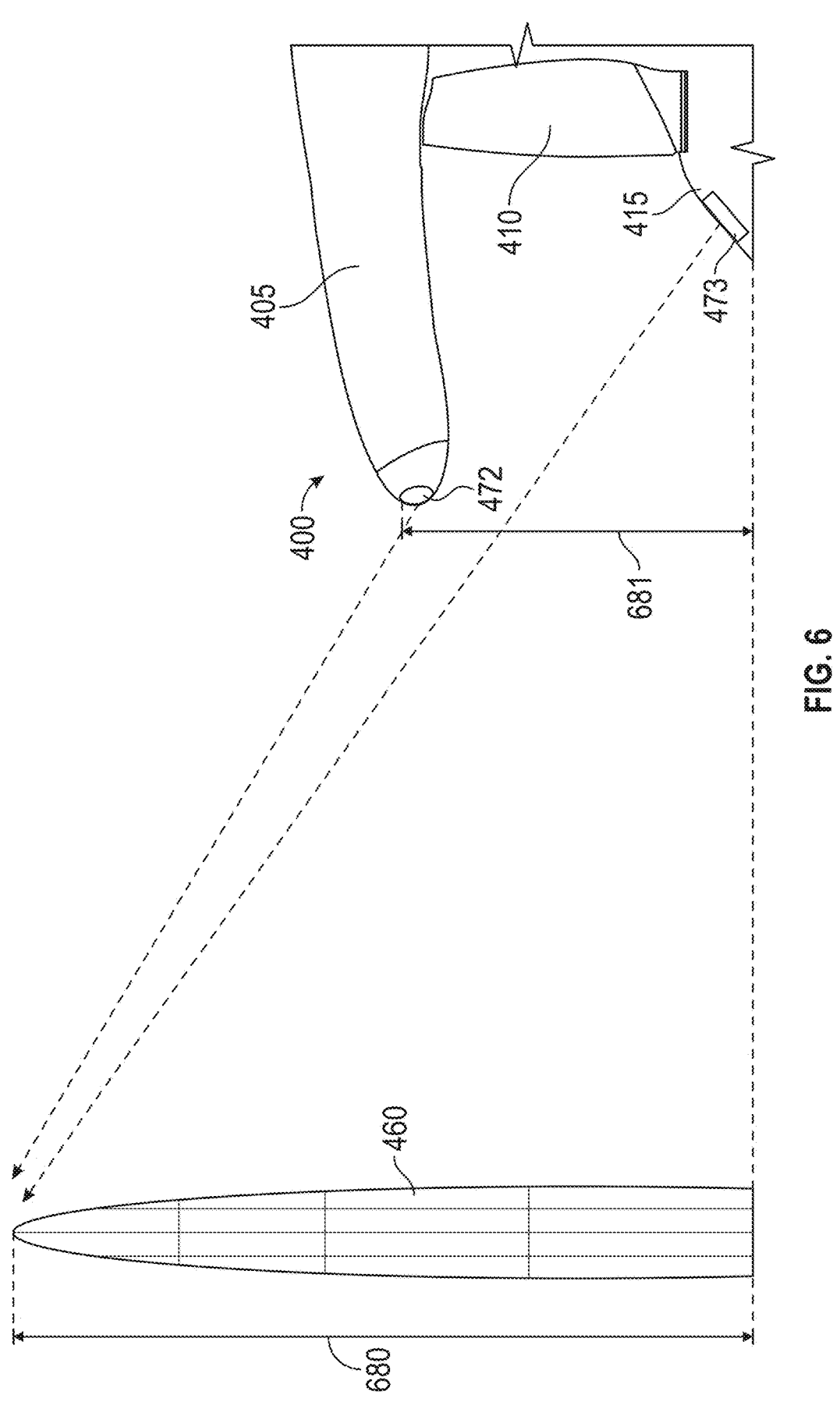
FIG. 6 shows a cross-sectional view taken along line 5-5 of the turbomachine engine shown in FIG. 4, when the projection system is mounted on a forward edge of the cowl and a spinner cone.

FIG. 6 shows a cross-sectional view taken along line 5-5 of the turbomachine engine 400 in FIG. 4. In this example, the projection system 470 includes a projector 472 mounted on the forward edge of the engine cowl 405, as well as a projector 473 mounted on the spinner cone 415. In other embodiments, the projection system 470 may only include projectors mounted on the spinner cone 415. The projection system 470 may include multiple additional projectors (not shown) that are spaced circumferentially around the circumference of the engine cowl 405, the circumference of the spinner cone 415, or both, in order to create three-dimensional patterns or holograms.

The position of projectors 472, 473 on the forward edge of the engine cowl 405, the inner surface of the engine cowl 405, the spinner cone 415, or any combination thereof, provides numerous potential geometries for the projected image 460. In some embodiments, the projected image 460 is amplified in size relative to the turbomachine engine 400, to improve the visibility of the projected image 460 to birds and to deter their intrusion from larger hazard areas. For example, the projected image 460 has a diameter (represented by arrow 680) that in some embodiments can be equal to or greater than a diameter (represented by arrow 681) of the turbomachine engine 400. Based on the position of the projectors 472, 473, the projected image 460 may be larger, and may be positioned farther in front of the turbomachine engine 400 to divert birds from approaching the aircraft or engine.

Bird strike events are not limited to engines, but may also happen to other areas of the aircraft 350, including but not limited to the cockpit windshield, the wings, and the tail. Accordingly, the projection system 470 may also be placed on the nose of the aircraft 350, the forward edge or forward-facing surfaces of the wings, the forward edge or forward-facing surfaces of the tail, or any combination thereof. Multiple projectors may be used to generate a single projected image 460, multiple projected images, or any combination thereof, to protect one or multiple areas of the aircraft 350 and the turbomachine engines 400 simultaneously.

Any of the various features discussed with any one of the embodiments discussed herein may also apply to and be used with any other embodiments. Further aspects of the present disclosure are provided by the subject matter of the following clauses.

A device for preventing bird strikes to an engine, the device including a projector mounted on a component of the engine. The projector is positioned to project an image outside of the engine.

The device according to the preceding clause, such that the projector is a holographic projector, and the image is a holographic image.

The device according to any preceding clause, such that the projector includes at least one laser source. At least one laser source generates laser light with a wavelength range of three hundred nanometers to four hundred nanometers.

The device according to any preceding clause, such that the image is one of a two-dimensional pattern and a three-dimensional image of an object.

The device according to any preceding clause, such that the image is projected to a position that is forward of the engine.

The device according to any preceding clause, such that the image has a diameter that is greater than an outer diameter of the engine.

The device according to any preceding clause, such that the component of the engine is a spinner cone.

The device according to any preceding clause, such that the projector includes multiple laser sources. The laser sources are positioned along an outer circumference of the spinner cone.

The device according to any preceding clause, such that the component of the engine is an engine cowl.

The device according to any preceding clause, such that the projector includes multiple laser sources. The laser sources are positioned around an inner circumference of the engine cowl.

The device according to any preceding clause, such that the engine is mounted to an aircraft, and the projector is positioned to project an image external to the aircraft.

The device according to any preceding clause, such that the engine is mounted to an aircraft, and the image is projected to a position that is forward of the aircraft.

The device according to any preceding clause, such that the engine is mounted to an aircraft, and the image has a diameter that is greater than an outer diameter of the aircraft.

A device for preventing bird strikes to an aircraft, the device including a projector mounted on a component of the aircraft. The projector is positioned to project an image external to the aircraft.

The device according to the preceding clause, such that the projector is a holographic projector, and the image is a holographic image.

The device according to any preceding clause, such that the projector includes at least one laser source. The laser source generating laser light with a wavelength range of three hundred nanometers to four hundred nanometers.

The device according to any preceding clause, such that the image is one of a two-dimensional pattern and a three-dimensional image of an object.

The device according to any preceding clause, such that the image is projected to a position that is forward of the component of the aircraft.

The device according to any preceding clause, such that the image has a diameter that is greater than an outer diameter of the aircraft.

The device according to any preceding clause, such that the component of the aircraft is a nose cone.

The device according to any preceding clause, such that the projector includes multiple laser sources. The laser sources are positioned along an outer circumference of the nose cone.

The device according to any preceding clause, such that the component of the aircraft is one of a wing and a tail.

The device according to any preceding clause, such that the projector includes at least one laser source that is positioned along a leading edge of the component of the aircraft.

An engine for an aircraft, the engine including an engine component, and further including a projector mounted on the engine component, the projector being positioned to project an image outside of the engine.

The engine of the preceding clause, such that the projector is a holographic projector, and the image is a holographic image.

The engine of any preceding clause, such that the projector includes at least one laser source, the at least one laser source generating laser light with a wavelength range of three hundred nanometers to four hundred nanometers.

The engine of any preceding clause, such that the image is one of a two-dimensional pattern and a three-dimensional image of an object.

The engine of any preceding clause, such that the image is projected to a position that is forward of the engine.

The engine of any preceding clause, such that the image has a diameter that is greater than an outer diameter of the engine.

The engine of any preceding clause, such that the component of the engine is a spinner cone.

The engine of any preceding clause, such that the projector includes multiple laser sources positioned along an outer circumference of the spinner cone.

The engine of any preceding clause, such that the component of the engine is an engine cowl.

The engine of any preceding clause, such that the projector includes multiple laser sources positioned around an inner circumference of the engine cowl.

The engine of any preceding clause, such that the engine is mounted to an aircraft, and the projector is positioned to project an image external to the aircraft.

The engine of any preceding clause, such that the engine is mounted to an aircraft, and the image is projected to a position that is forward of the aircraft.

The engine of any preceding clause, such that the engine is mounted to an aircraft, and the image has a diameter that is greater than an outer diameter of the aircraft.

A method of producing an engine of an aircraft, including providing the engine, the engine having a component, positioning a projector on the component of the engine, and adapting the projector to project an image outside of the engine.

The method of the preceding clause, such that the projector is a holographic projector, and the image is a holographic image.

The method of any preceding clause, such that the projector includes at least one laser source, the at least one laser source generating laser light with a wavelength range of three hundred nanometers to four hundred nanometers.

The method of any preceding clause, such that the image is one of a two-dimensional pattern and a three-dimensional image of an object.

The method of any preceding clause, such that the image is projected to a position that is forward of the engine.

The method of any preceding clause, such that the image has a diameter that is greater than an outer diameter of the engine.

The method of any preceding clause, such that the component of the engine is a spinner cone.

The method of any preceding clause, such that the projector includes multiple laser sources, the method further including positioning the plurality of laser sources along an outer circumference of the spinner cone.

The method of any preceding clause, such that the component of the engine is an engine cowl.

The method of any preceding clause, such that the projector includes multiple laser sources, the method further including positioning the plurality of laser sources around an inner circumference of the engine cowl.

The method of any preceding clause, further including mounting the engine to an aircraft and adapting the projector to project the image external to the aircraft.

The method of any preceding clause, further including mounting the engine to an aircraft and adapting the projector to project the image to a position that is forward of the aircraft.

The method of any preceding clause, further including mounting the engine to an aircraft, such that the image has a diameter that is greater than an outer diameter of the aircraft.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A device for preventing bird strikes to an engine, the device comprising:
   a projector mounted on a component of the engine, the projector being positioned to project an image outside of the engine, wherein the image is at least one of a two-dimensional pattern or a three-dimensional image of an object.

2. The device of claim 1, wherein the projector is a holographic projector, and the image is a holographic image.

3. The device of claim 1, wherein the projector comprises at least one laser source, the at least one laser source generating laser light with a wavelength range of three hundred nanometers to four hundred nanometers.

4. The device of claim 1, wherein the image is projected to a position that is forward of the engine.

5. The device of claim 1, wherein the image has a diameter that is greater than an outer diameter of the engine.

6. The device of claim 1, wherein the component of the engine is a spinner cone, and the projector comprises a plurality of laser sources positioned along an outer circumference of the spinner cone.

7. The device of claim 1, wherein the component of the engine is an engine cowl, and the projector comprises a plurality of laser sources positioned around an inner circumference of the engine cowl.

8. The device of claim 1, wherein the engine is mounted to an aircraft, and the image is projected to a position that is forward of the aircraft.

9. The device of claim 1, wherein the engine is mounted to an aircraft, and the image has a diameter that is greater than an outer diameter of the aircraft.

10. The device of claim 1, wherein the image includes at least one of a two-dimensional grid pattern or a two-dimensional grill pattern.

11. An engine for an aircraft, the engine comprising:

an engine component; and a projector mounted on the engine component, the projector being positioned to project an image outside of the engine, wherein the image is at least one of a two-dimensional pattern or a three-dimensional image of an object.

12. The engine of claim 11, wherein the projector is a holographic projector, and the image is a holographic image.

13. The engine of claim 11, wherein the projector comprises at least one laser source, the at least one laser source generating laser light with a wavelength range of three hundred nanometers to four hundred nanometers.

14. The engine of claim 11, wherein the image is projected to a position that is forward of the engine.

15. The engine of claim 11, wherein the image has a diameter that is greater than an outer diameter of the engine.

16. The engine of claim 11, wherein the engine component is a spinner cone, and the projector comprises a plurality of laser sources positioned along an outer circumference of the spinner cone.

17. The engine of claim 11, wherein the engine component is an engine cowl, and the projector comprises a plurality of laser sources positioned around an inner circumference of the engine cowl.

18. The engine of claim 11, wherein the engine is mounted to the aircraft, and the image is projected to a position that is forward of the aircraft.

19. The engine of claim 11, wherein the engine is mounted to the aircraft, and the image has a diameter that is greater than an outer diameter of the aircraft.

20. The engine of claim 11, wherein the image includes at least one of a two-dimensional grid pattern or a two-dimensional grill pattern.

\* \* \* \* \*